(12) United States Patent
Buckley

(10) Patent No.: US 7,786,849 B2
(45) Date of Patent: Aug. 31, 2010

(54) TRAILER DETECTION SYSTEM

(75) Inventor: Stephen J. Buckley, Novi, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 755 days.

(21) Appl. No.: 11/670,562

(22) Filed: Feb. 2, 2007

(65) Prior Publication Data

US 2008/0186204 A1 Aug. 7, 2008

(51) Int. Cl.
| | |
|---|---|
| G08B 21/00 | (2006.01) |
| B60Q 1/00 | (2006.01) |
| G08G 1/00 | (2006.01) |
| B60D 1/28 | (2006.01) |
| B60K 28/00 | (2006.01) |
| B60K 28/10 | (2006.01) |
| B60L 3/00 | (2006.01) |
| B60R 21/00 | (2006.01) |
| B60R 22/00 | (2006.01) |
| B60T 7/12 | (2006.01) |
| B60T 7/22 | (2006.01) |
| G05D 3/00 | (2006.01) |

(52) U.S. Cl. ............... 340/431; 340/435; 340/436; 340/686.1; 340/686.6; 340/901; 180/271; 180/274; 701/45

(58) Field of Classification Search ............ 340/431, 340/435–436, 440, 686.1–686.6, 901, 932.2; 180/271, 274; 701/45–47, 93–98; 342/70–74

See application file for complete search history.

(56) References Cited

U.S. PATENT DOCUMENTS

| | | | |
|---|---|---|---|
| 5,521,579 A | 5/1996 | Bernard | |
| 5,558,350 A * | 9/1996 | Kimbrough et al. | 280/426 |
| 6,225,891 B1 * | 5/2001 | Lyons et al. | 340/435 |
| 6,388,565 B1 | 5/2002 | Bernhard et al. | |
| 6,446,998 B1 * | 9/2002 | Koenig et al. | 280/432 |
| 6,594,614 B2 * | 7/2003 | Studt et al. | 702/150 |
| 6,674,394 B1 | 1/2004 | Zoratti | |
| 6,734,807 B2 * | 5/2004 | King | 340/903 |
| 6,882,287 B2 | 4/2005 | Schofield | |
| 7,480,570 B2 * | 1/2009 | Yopp et al. | 701/301 |
| 2002/0030591 A1 * | 3/2002 | Paranjpe | 340/436 |
| 2002/0154005 A1 * | 10/2002 | Wall et al. | 340/431 |
| 2004/0153244 A1 * | 8/2004 | Kellum | 701/301 |
| 2005/0068197 A1 * | 3/2005 | Regan | 340/932.2 |
| 2007/0109111 A1 * | 5/2007 | Breed et al. | 340/435 |
| 2008/0024283 A1 * | 1/2008 | Kim | 340/431 |

* cited by examiner

Primary Examiner—Benjamin C Lee
Assistant Examiner—Michael Shannon
(74) Attorney, Agent, or Firm—Ralph E. Smith

(57) ABSTRACT

A proximity sensor system for a vehicle includes a first remote sensor that senses objects in a rearward area relative to the vehicle. A trailer detection module determines that one of the objects is a trailer that is attached to the vehicle based on a repeating pattern of signals from the first remote sensor. A response module selectively responds to the objects other than the trailer based on the objects outside of a predetermined distance threshold. An indicator responds to response module signals.

5 Claims, 6 Drawing Sheets

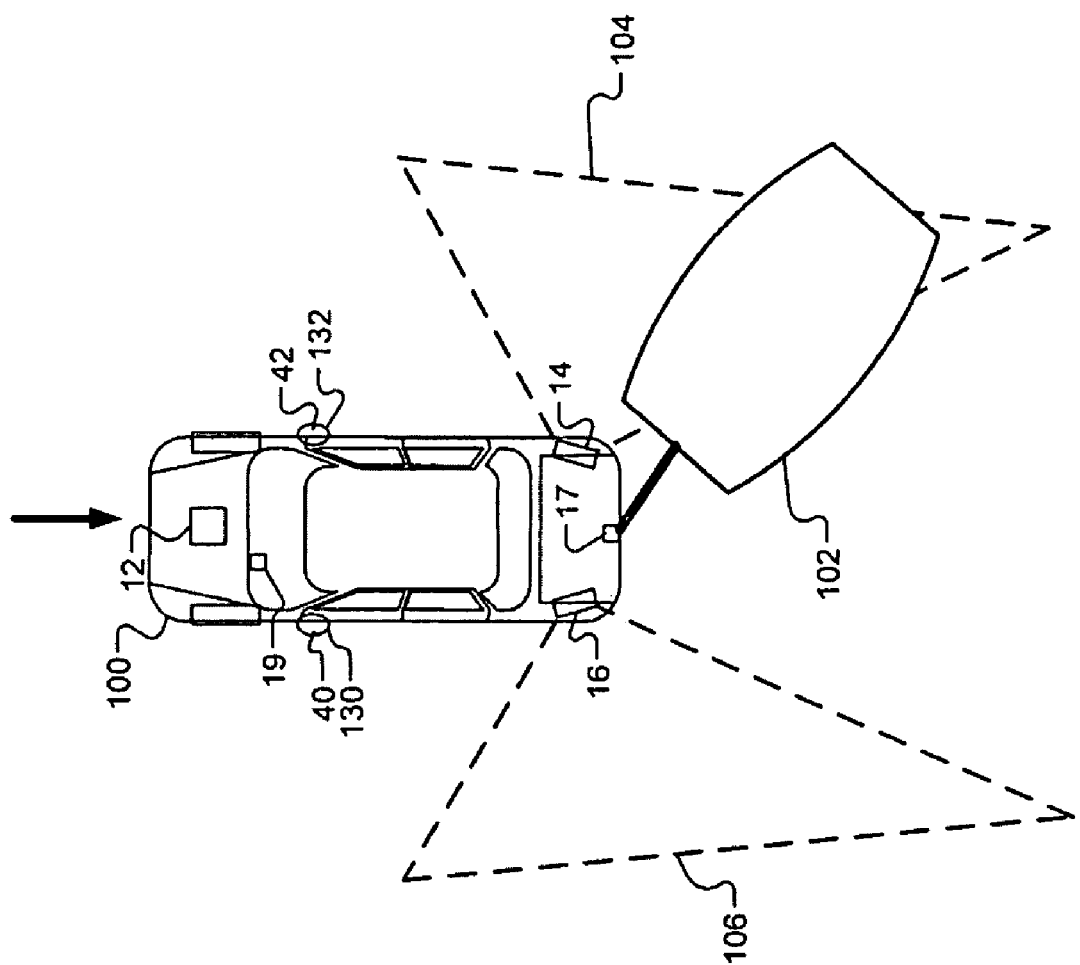

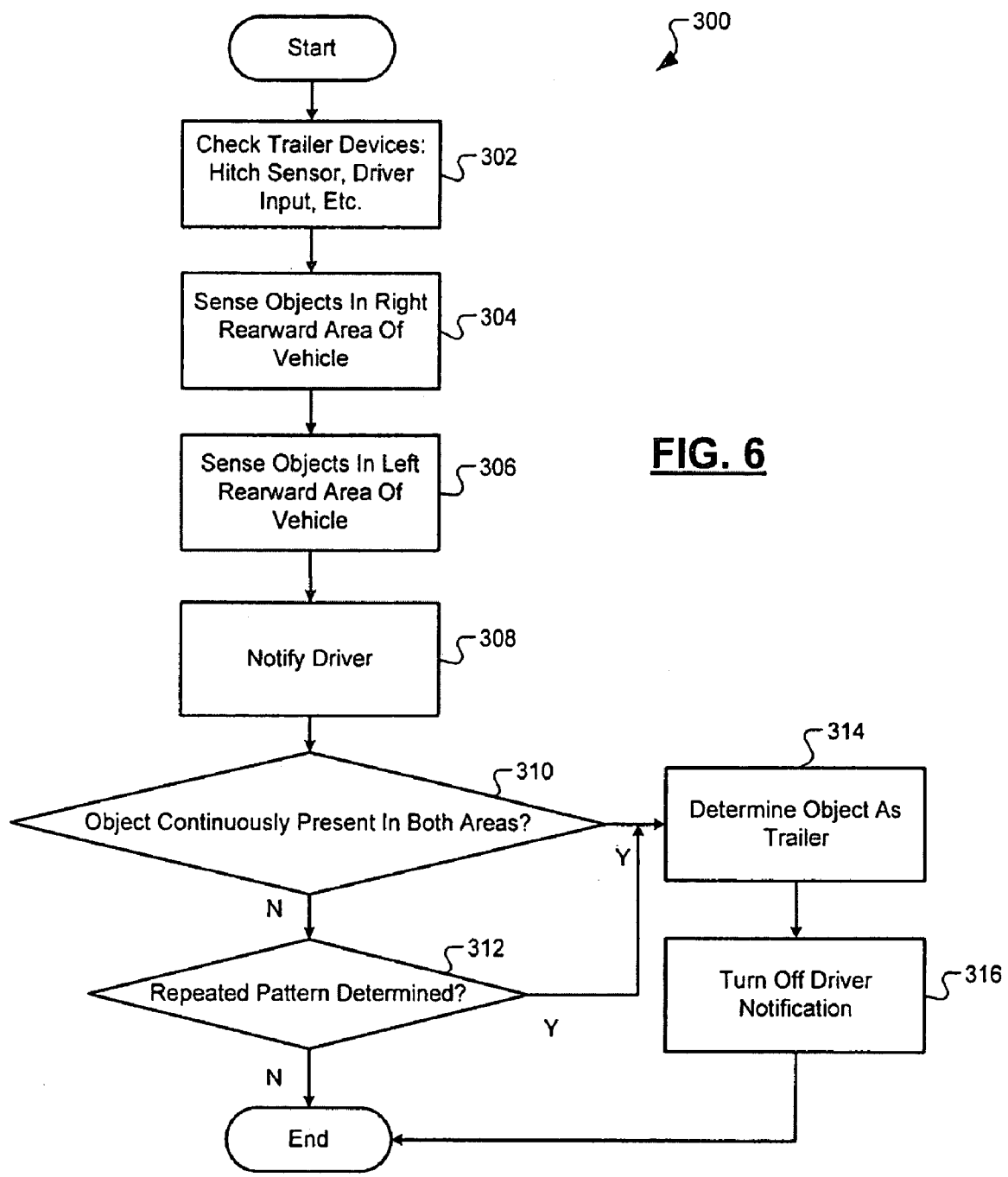

TRAILER DETECTION SYSTEM

FIELD OF THE DISCLOSURE

The present disclosure relates to sensor systems and more particularly to remote sensing systems for vehicles.

BACKGROUND OF THE DISCLOSURE

The background description provided herein is for the purpose of generally presenting the context of the disclosure. Work of the presently names inventors, to the extent it is described in this background section, as well as aspects of the description that may not otherwise qualify as prior art at the time of filing, are neither expressly nor impliedly admitted as prior art against the present disclosure.

Drivers are often required to exercise judgment in the maneuvering of vehicles with respect to other objects that may be stationary or in motion. Such objects may be street signs, pedestrians, or other vehicles. This is particularly apparent when a vehicle is in reverse negotiating a parking space, driveway and/or when the vehicle is towing a trailer, caravan, or other object. Although the use of side mirrors can assist, there may be blind spots. Many vehicles include proximity sensing systems that provide the driver an indication of an object or, more preferably, the proximity of the object that may be obscured by a blind spot.

Proximity sensing systems may include rearwardly mounted sensors that detect when an object to be towed is fitted to the vehicle. The rearwardly mounted sensors may indicate the location of the towed object. Reversing or turning with a towed object may be considerably difficult both in terms of judgment and feasibility. Providing accurate proximity information to the driver may improve vehicle navigation.

SUMMARY OF THE DISCLOSURE

A proximity sensor system for a vehicle includes a first remote sensor that senses objects in a rearward area relative to the vehicle. A trailer detection module determines that one of the objects is a trailer that is attached to the vehicle based on a repeating pattern of signals from the first remote sensor. A response module selectively responds to the objects other than the trailer based on the objects outside of a predetermined distance threshold. An indicator responds to response module signals.

In other features, a method for controlling a remote sensor system for a vehicle includes sensing first objects in a right rearward area relative to the vehicle. The method also includes sensing second objects in a left rearward area relative to the vehicle and sensing a steering angle of the vehicle. The method includes determining that one of the first and second objects is a trailer that is attached to the vehicle based on repeating patterns within the right and left rearward areas and the steering angle. The method includes selectively responding to the first and second objects other than the trailer based on the first and second objects outside of a predetermined distance threshold.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a schematic diagram illustrating operation of the proximity sensor system in accordance with the present disclosure; and FIG. 6 is a block diagram illustrating a method for operating the proximity sensor system in accordance with the present disclosure.

DETAILED DESCRIPTION OF THE PREFERRED EMBODIMENTS

Figure 1:
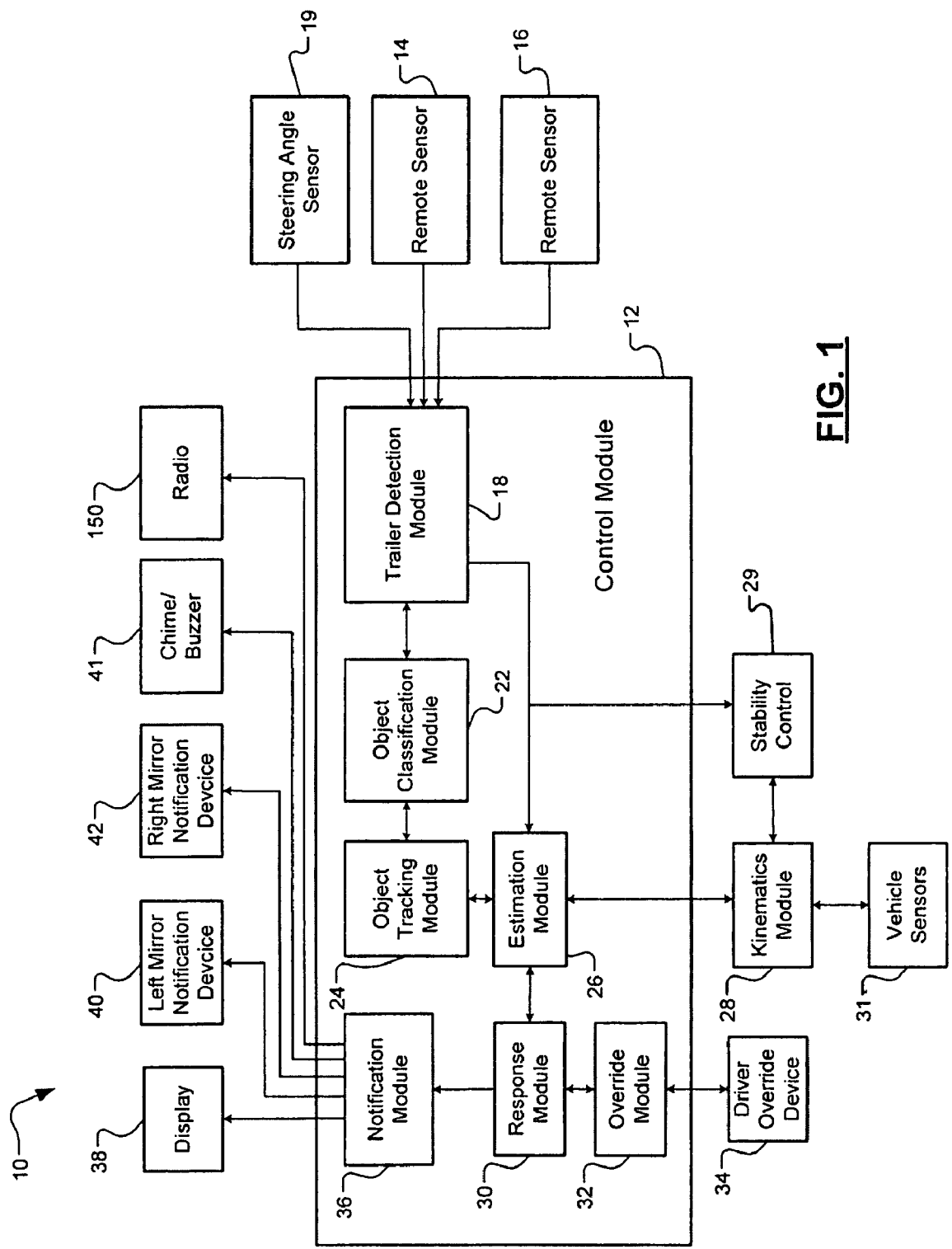
FIG. 1 is a block diagram illustrating a proximity sensor system for a vehicle in accordance with the present disclosure.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure includes a vehicle proximity system that detects position and/or movement of a trailer, such as a boat, utility, or camper trailer, with respect to a vehicle.

Referring now to FIG. 1, the vehicle proximity system 10 includes a control module 12 that receives remote signals from first and second remote sensors 14, 16 and a steering angle sensor 19 that are coupled to a vehicle. A trailer detection module 18 of the control module 12 receives sensor signals and determines that a trailer is attached to the vehicle. An object classification module 22 may track all objects sensed by the first and second remote sensors 14, 16.

An object tracking module 24 tracks the trailer based on trailer detection module signals. An estimation module 26 estimates a threat, such as a threat of jackknifing the trailer. The estimation module 26 also estimates the threat of impact between the vehicle and an external object based on object tracking module signals, signals from a kinematics module 28, and/or signals from a stability control system 29. Kinematics module signals may indicate the position and direction of movement of the vehicle based on signals from vehicle sensors 31. The kinematics module 28 may communicate with the control module 12 through a wired or wireless control area network (CAN) bus of the vehicle. The system 10 may broadcast over the CAN bus the identification of the trailer.

A response module 30 responds to estimation module signals and determines various responses, if any, that vehicle systems will generate based on estimation module signals. The response module 30 may be overridden by an override module 32 controlled by a driver override device 34. The response module 30 may generate signals that control a notification module 36 such that the notification module 36 controls indicators, such as audible and/or visual indicators for the driver. Such indicators may include a visual display, such as parking display 38, a left mirror notification device 40, and/or a right mirror notification device 42. Such indicators may also include audible devices, such as chimes or buzzers 41. The indications may also display a message that a trailer was detected and/or request driver input as confirmation.

The stability control system 29 may use response module 30 signals to maintain stability of the vehicle through changing a stability algorithm based on knowledge of the trailer. Other on-board electronic or mechanical systems may benefit from detection of an attached trailer. For example, a transmission of the vehicles may use a modified shift pattern if the transmission controller knows there is an extra load attached to the vehicle. Further, the automatic suspension system may change a damping rate of the vehicle based on the extra weight of the trailer.

Figure 2:
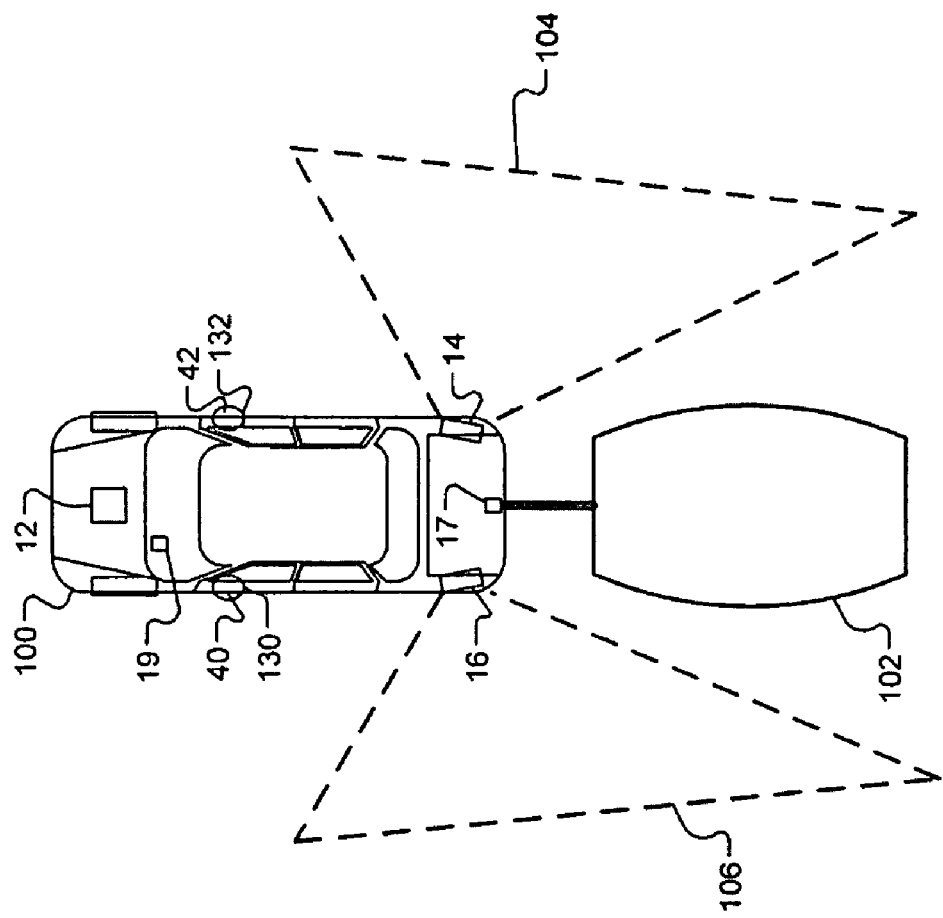
FIG. 2 is a schematic diagram illustrating operation of the proximity sensor system in accordance with the present disclosure.

Referring now to FIGS. 1 and 2, the vehicle proximity system 10, which may be a blind spot radar detection system, may operate when a vehicle 100 is moving in a forward or reverse direction. The system 10 alerts a driver to position of a trailer 102 and other objects, such as vehicles that are laterally positioned in relation to the vehicle 100 within zones of detection 104, 106 of the remote sensors. The remote sensors 14, 16 may be radar, lidar, vision based sensors or other remote sensors. The remote sensors 14, 16 may detect both position and speed of the trailer 102 and other objects. Objects, such as the trailer 102, that meet alert criteria within the response module 30 may trigger both the visual and/or audible alert to the driver. The alert criteria may be based on predetermined conditions where impact is likely to occur.

The sensors 14, 16 may identify the presence of garage structures, vehicles, trees, bicycles, shopping carts, pedestrians, fire hydrants, boulders, toys, and other objects on the sides of the vehicle 100. All detected objects, regardless of size, moving or stationary, may trigger a visual and/or audio alert The vehicle 100 may include left and right side mirrors 130, 132. Left and right mirror notification devices 40, 42 may generate icons that appear on the side mirrors 130, 132 to create a threat and/or a degree of threat. An icon may appear on the mirrors 130, 132 on the side of the vehicle 100 corresponding to the detected object. If objects are detected on both sides of the vehicle 100, icons (e.g. left and right mirror notification devices 40, 42) on both mirrors 130, 132 may be illuminated.

The vehicle 100 may also include the parking display 38 so that there is a redundant/secondary visual indication of on object in a rear cross path of the vehicles 100. A parking display 38, such as a Parksense visual display or a Parktronics visual display, may display a series of light-emitting diodes (LEDs) that indicate to the driver how far the vehicle 100 is to objects off the rear bumper of the vehicle 100. The parking display 38 may also include arrow icons that illustrate which direction the object or threat is in relation to the vehicle 100. The parking display 38 may illuminate simultaneously with icons on side mirror 130, 132, such that the driver may use side mirrors, rear view mirrors, or visual confirmation through glancing back through a rear window of the vehicle to determine threat and/or navigate the vehicle 100. The response module may also trigger a chime and/or buzzer 41 that may indicate relative threat to the vehicle based on estimation module and response module signals.

In one embodiment of the disclosure, both a visual and an audible alert may be triggered. During the audible alert, the system 10 may mute a radio 150 and may provide a tone from either or both a chime 41 and a parking display 38. These alerts may remain in effect until the object is no longer present or the object stops. If the object stops outside of a predetermined distance threshold, such as 4 meters, both the visual and audible alerts may cease. If the object stops inside of the threshold, the audible alert may stop but the visual alert may continue.

The system 10 may continuously monitor the sensors 14, 16. In the case of very wide trailers, the trailer may always be visible to the sensors 14, 16. The front leading, edge corners of the trailer may appear equidistant from the vehicle 100 as the vehicle 100 and trailer 102 move in a straight line. Initially, the response module 30 responds to all objects present in both radar zones 104, 106 that that the estimation module determines to be a potential threat. As time progresses, the trailer detection module 18 may identify the trailer 102 as an object that is continually detected, and the response module 30 may turn off notification signals relating to the trailer 102. The system 10 may identify many different objects in the radar detection zone. Therefore, a stationary object, such as an attached trailer, may not affect the detection of other objects in the zones 104, 106.

Figure 3:
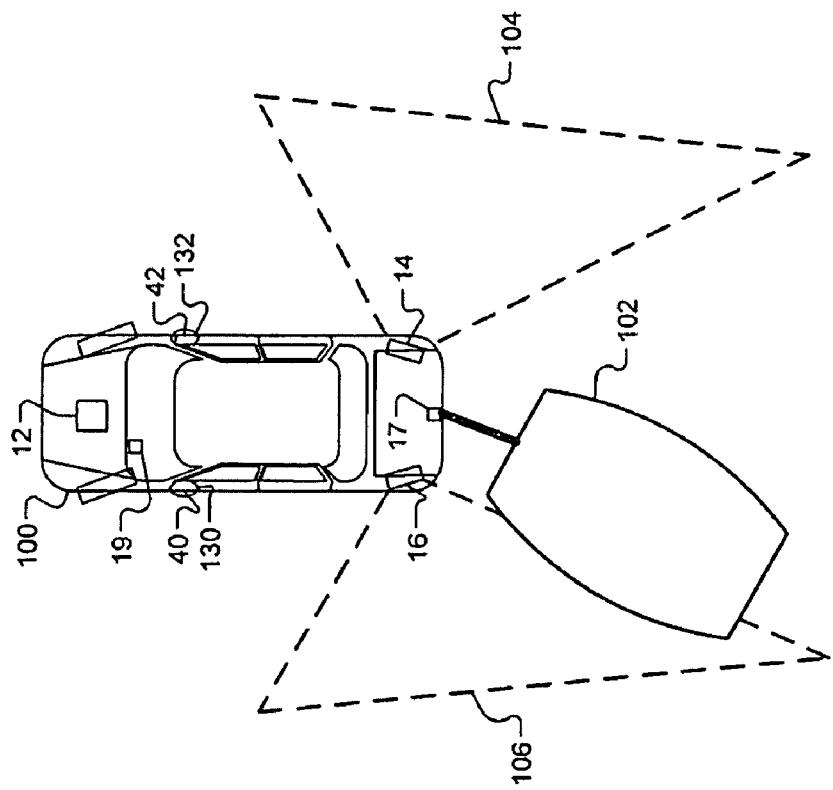
FIG. 3 is a schematic diagram illustrating operation of the proximity sensor system in accordance with the present disclosure.
Figure 4:
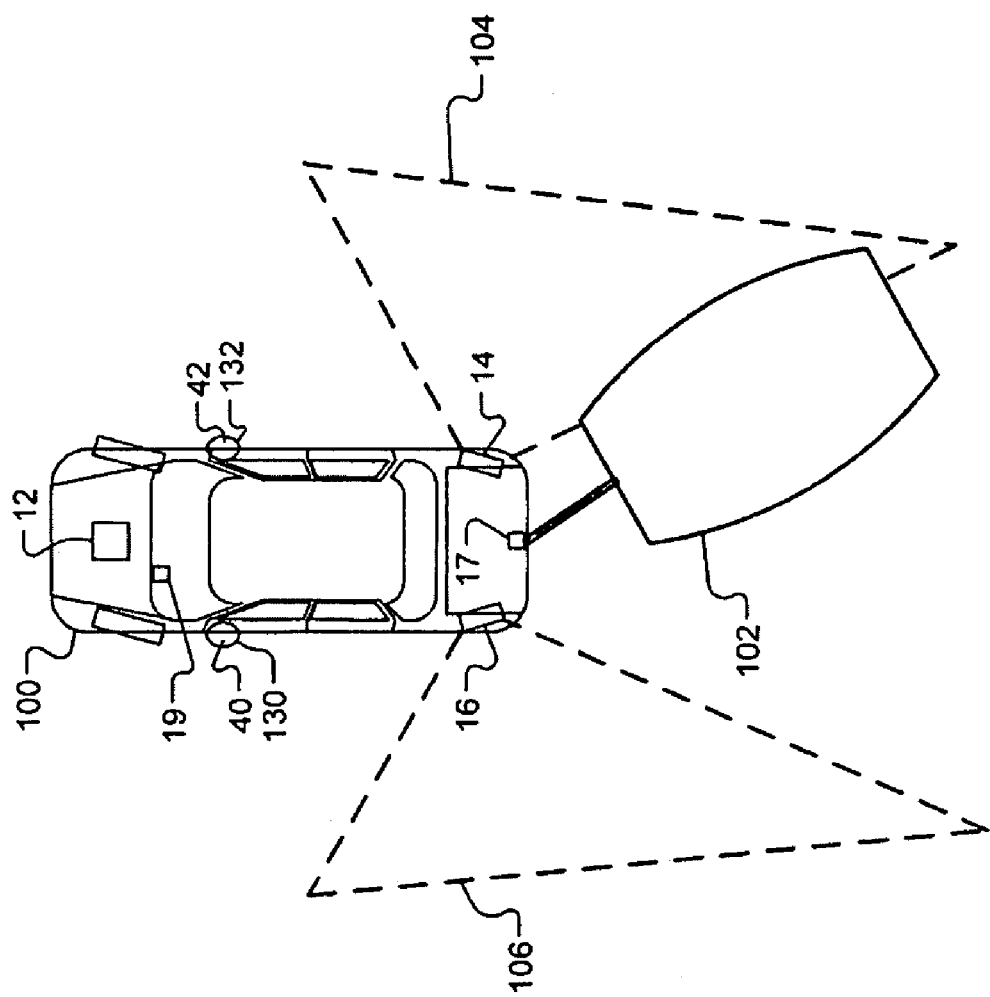
FIG. 4 is a schematic diagram illustrating operation of the proximity sensor system in accordance with the present disclosure.

Referring now to FIGS. 3 and 4, in an alternative embodiment, the trailer 102 may be too slender to be visible to the system 10 when the vehicle 100 is traveling in a straight line. The system 10 may continuously monitor the radar sensors, 14, 16 for input and correlate that data with steering angle sensor signals. In other words, the front leading edge corners of the trailer 102 become visible as the vehicle 100 turns in an arc. The trailer detection module 18 logs the steering angle and "object present" data over time and detects a repeating pattern. Since the trailer is assumed symmetrical, the corners of the trailer 102 may appear at the same turning angle on both sides. The trailer detection module 18 may also compare the opposite turning angle with sensor information from the other vehicle side.

Initially, the response module 30 may activate blind spot warning indicators when an object is present in either zone 104, 106 that meets the object warning criteria. As time progresses, the system 10 can identify the trailer (repeated object appearances at same turning angle) and turn off respective warnings.

Referring now to FIG. 5, the system 10 may also detect a potential jackknife condition and alert the driver. As a vehicle 100 moves in reverse with a trailer 102 attached, the trailer 102 and vehicle 100 may back up on different vectors and enter a jackknife condition. The object tracking module 24 may monitor for objects that are moving within a minimum distance threshold to rear quarter panels of the vehicle 100 and alert the driver through the response module 30. Such objects may include trees, poles, other cars, etc. The response module 30 may respond to a jackknife condition by indicating that an object is too close to the vehicle 100.

Referring now to FIG. 6, a block diagram 300 illustrates an exemplary method for operating the proximity sensor system in accordance with the present disclosure. In step 302, the system checks whether trailer attachment information is available, such as driver input or hitch sensor data. In step 304, a right side remote sensor senses objects in a an area rearward to the vehicle. In step 306, a left side remote sensor senses objects in another area rearward to the vehicle. In step 308, the system notifies the driver of objects detected by the right and left remote sensors.

In step 310, if an object is not continually present in both areas, step 312 determines whether there is a repeated pattern of object occurrence. The repeated pattern determination may include analyzing left and right sensor data in relation to left and right steering angles of the vehicle. If steps 310, 312 are true, a step 314 determines that the object is a trailer. In step, 316 driver notification is turned on with respect to notification based on the trailer.

In operation, a control method foe a remote sensor system for a vehicle includes sensing first objects in a right rearward area relative to the vehicle. The method also includes sensing second objects in a left rearward area relative to the vehicle and sensing a steering angel of the vehicle. The method includes determining that one of the first and second objects is a trailer that is attached to the vehicle based on repeating patterns within the right and left rearward areas and the steering angle. The method includes selectively responding to the first and second objects other than the trailer based on the first and second objects outside of a predetermined distance threshold.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A proximity sensor system for a vehicle, the system comprising:
   a first remote sensor that senses first objects in a right rearward area relative to the vehicle;
   a second remote sensor that senses second objects in a left rearward area relative to the vehicle;
   a steering angle sensor that senses a steering angle of the vehicle;
   a trailer detection module in communication with said first remote sensor, said second remote sensor, and said steering angle sensor, said trailer detection module identifying a first condition when said first remote sensor senses an object in said right rearward area in conjunction with said steering angle sensor sensing a first steering angle and identifying a second condition when said second remote sensor senses an object in said left rearward area in conjunction with said steering angle sensor sensing a second steering angle different than said first steering angle and determining the presence of a trailer attached to the vehicle based on a predetermined pattern of at least one of said first condition and said second condition;
   a response module that selectively responds to said first and second objects other than said trailer based on said first and second objects other than said trailer outside of a predetermined distance threshold; and
   an indicator that responds to response module signals.

2. The system of claim 1 wherein said response module initially responds to said trailer.

3. The system of claim 1 wherein said response module responds to all of said first and second objects within said predetermined distance threshold.

4. The system of claim 1 wherein a stability control module responds to response module signals.

5. A control method for a remote sensor system for a vehicle, the method comprising:
   sensing first objects in a right rearward area relative to the vehicle;
   sensing second objects in a left rearward area relative to the vehicle;
   sensing a steering angle of the vehicle;
   identifying a first condition when an object is detected in said right rearward area in conjunction with a first steering angle;
   identifying second condition when an object is detected in said left rearward area in conjunction with a second steering angle different than said first steering angle;
   determining the presence of a trailer attached to the vehicle based on a predetermined pattern of at least of said first condition and said second condition; and
   selectively responding to said first and second objects other than said trailer based on said first and second objects other than said trailer outside of a predetermined distance threshold.

* * * * *